Oct. 24, 1967   R. H. NEALY   3,348,570
VALVE ASSEMBLY FOR ISOLATING CONTROLLED FLUID FROM VALVE HOUSING
Filed Dec. 10, 1962

INVENTOR
ROBERT H. NEALY

BY *John J. Byrne*
ATTORNEY

United States Patent Office 3,348,570
Patented Oct. 24, 1967

3,348,570
VALVE ASSEMBLY FOR ISOLATING CONTROLLED FLUID FROM VALVE HOUSING
Robert H. Nealy, 3 Clovis Road,
East Brunswick, N.J. 08816
Filed Dec. 10, 1962, Ser. No. 243,265
3 Claims. (Cl. 137—315)

This invention relates to improvements in valves with particular reference to that class known as high-pressure bar-stock valves and has as its objective to provide a construction which separates the operational and supportive elements of the valve, and specifically, to provide a conduit seat structure for use with a replaceable core which, together, act to isolate the fluid stream from the valve housing.

The operational elements of a high-pressure valve are (a) the conduit seats (b) the elements pertaining to the partial or complete interruption of the fluid stream, including the stuffing box and valve stem, and, (c) the internal conduit or passage thru which the fluid passes in transit from the inlet port or ports to the outlet port or ports. The supportive elements are (a) the valve body and (b) the conduit connection and stuffing box threads which support the end loads imposed on the conduit and stem.

Different service requirements are imposed on the operational and supportive elements; in general the operational elements are subject to deterioration as a consequence of use while the supportive elements are not. Separation of these elements provides a construction in which these differing requirements can be treated independently and in which these elements are subjected only to those influences implicit to their function. Thus, the supportive elements are conserved in service with a substantial saving in replacement costs and the expandable operational elements may be replaced as required at substantially lower cost than that of complete replacement of the valve.

There is known to the art valves which provide removable seats and/or core members but the construction embodied in this invention is unique in its complete isolation of these two sets of elements from those service influences not pertinent to their functions.

In many systems it is necessary to control the volume or flow of a fluid stream along a conduit. Depending on the ultimate use of the fluid stream, the valves are also oftentimes used to not only control flow, but to serve as a branch point for such fluid streams. The composition or metallic alloys of the valves must, necessarily, be resistant to corrosion from the fluid stream. Under conditions where various fluids are used during different processes the replacement of entire valves is an appreciable bother and expense. Therefore, it is one of the further objectives of this invention to provide a valve housing isolated from the process stream by an exchangeable inner core assembly whose material or internal configuration is appropriate to system requirements.

Another objective of the invention is to provide a valve which is readily adaptable to control process streams carried by conduits having varying circumferences and wall widths.

In current high-pressure practice many types and sizes of tubing connections are employed in response to varying application requirements. The construction embodied in this invention discloses a tubing seat piece into which any selected tubing seat construction may be machined, and thus any combination of tubing seats may be employed in a given valve as service conditions indicate and the combination of seats may be changed at any time in a given valve as desired. As a consequence a much wider variety of possible service requirements can be provided for with a much smaller inventory investment. This type valve is most frequently used in research applications where systems and system requirements change frequently.

A still further objective of the invention is to provide a valve construction wherein the valve stem packing gland is equipped with a thread opposite in rotation to that of the valve stem operating stem, whereby the unit is self-locking and the need of auxiliary safety locks is eliminated.

These and other objectives and advantages of the invention will be more fully understood upon a reading of the following specification taken in view of the attached drawings wherein.

Figure 1:
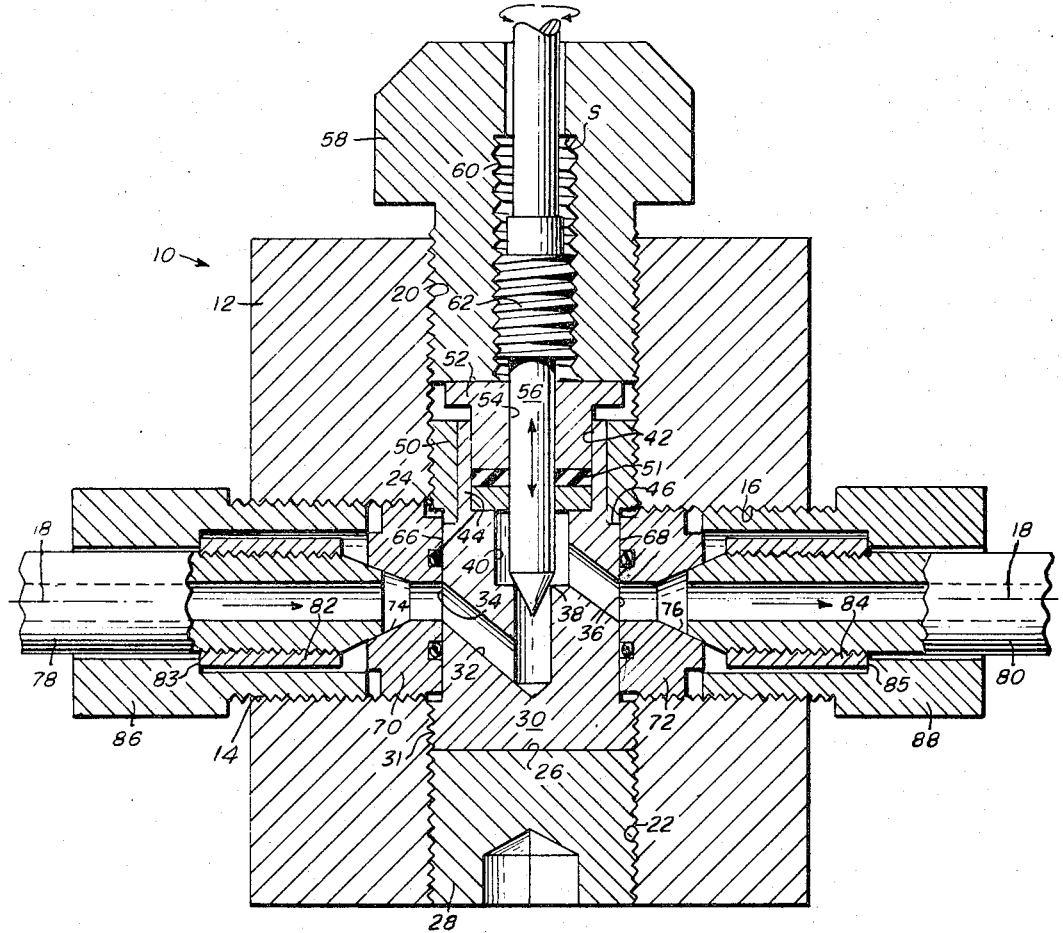
FIGURE 1 is a cross-sectional view of the valve assembly showing the interior thereof.
Figure 2:
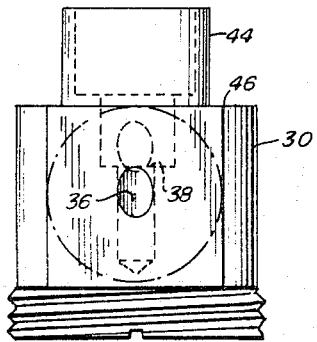
FIGURE 2 is a side elevation view of the core structure.
Figure 3:
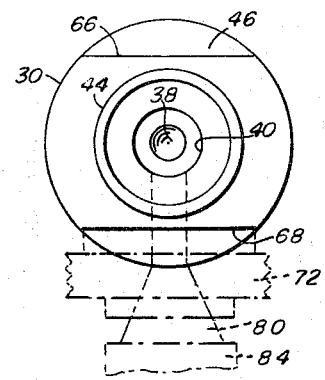
FIGURE 3 is a plan view of the core.

Referring now to the drawings wherein like numerals indicate like elements, the numeral 10 indicates the valve assembly of this invention. The assembly includes a valve housing 12 having a pair of threaded conduit receiving openings 14 and 16 having a common central axis 18. A second co-axial pair of threaded openings 20 and 22 intersect the openings 16 and 14, and at said point of intersection there is formed a core receiving chamber 24.

As seen best in FIG. 1, the bottom of chamber 24 is defined by an inner surface 26 of a threaded plug member 28. A removable core 30, substantially fills the chamber 24, and has its bottom surface adjacent surface 26. The core is formed with a bore 32 having an inlet opening 34, an outlet opening 36, and a valve seat 38 formed intermediate its length. An upper bore 40 is formed within said core in line with valve seat 38. In the embodiment shown, the core is reduced in diameter about its outer upper portion, and is counter-bored at 42 which forms a thin walled cylindrical pocket 44. Due to the reduction in diameters between the main core and the pocket there is formed an annular bearing shoulder 46. The lower portion of core 30 is formed with a threaded section 31 mating with the threads of bore 22.

A retaining ring 50 is threadably received in opening 20 and is adapted to circumscribe the walls of pocket 44. The ring 50 is shrink-fitted to the walls of the pocket, reinforces it, but can be formed integral therewith if desired. A two-piece guide member 52 having a central bore 54 therethrough slidably receives a valve control stem or closure member 56. Suitable sealing means 51 carried by the two-piece member are provided between the valve stem and its guiding member. A packing gland nut 58, having an inner guide bore 60, co-axial with member 52, threadably receives a stem extension 62. It is readily seen that by rotating stem extension 62, the valve stem is made to open or close the flow path through seat 38. The gland nut 58 is formed with a left-hand thread while the stem 62 is formed with a right-hand thread. Consequently, when the valve is fully opened, the top of the stem thread abuts the shoulder S and any further force tends to tighten the nut 58.

On opposed opposite surfaces surrounding the inlets 34 and 36, respectively, are flattened surfaces 66 and 68, respectively. The flattened surfaces are points of engagement with a pair of conduit seats 70 and 72, which are threadably received in openings 14 and 16. Suitable O-rings are provided between the surfaces. These seats have bores therethrough in communication with inlets 34 and 36 and are equipped with truncated annular bevels 74 and 76.

The bevels are bearing surfaces to receive the inner ends of first and second conduits 78 and 80 carrying the process stream. Threadably received on the ends of each of the conduits are collars 82 and 84. The collars provide shoulders 83 and 85 to which the conduit retaining nuts 86 and 88 may bear as they are threadably secured in openings 14 and 16.

In most instances the preferred composition of housing 12 is stainless steel. However, stainless steel is not always the preferred composition for handling various process streams. There has been described an assembly by which the process stream is completely isolated from the valve housing by conduits 78 and 80, seats 70 and 72, and the core member 30. In the event the bearing seat 38 (the most likely area of leakage) becomes worn, the core 30 may be replaced by merely unscrewing seats 70 and 72 and removing the core via openings 20 or 22.

It will be understood by those skilled in the art that cores having different interior configurations, but identical outside configurations, may be replaced within the housing 12 for the particular core shown in the described embodiment. For instance, a second outlet could be taken from the chamber 24 by having a second branch bore in communication with bore 32 which would also be in communication with another passage stream conduit. A valve retaining nut and its associated structure, identical to that shown within openings 14 and 16, would conveniently replace plug 28 for these purposes.

In a general manner, while there has been disclosed in the above description, what is deemed to be the most practical and efficient embodiment of the invention, it should be well understood that the invention is not limited to such an embodiment as there might be changes made in the arrangement, disposition and form of the parts without departing from the principle of the present invention as comprehended within the scope of the accompanying claims.

I claim:
1. A valve for controlling fluid in a process stream flowing from a first conduit to a second conduit comprising a valve housing having a pair of opposed aligned openings leading to the interior thereof, and a third opening extending through said housing and substantially perpendicular to and intersecting the common axis of said pair of openings, a removable core within said housing at the point of intersection and having a bore therethrough, said bore having an inlet and outlet respectively in communication with said pair of openings, a valve seat intermediate the length of said bore, a valve closure in said third opening, a valve operator in said third opening to bring said valve closure toward and away from said seat, removable conduit seats in sealing engagement with said core about said inlet and said outlet, said seats respectively receiving in sealing engagement each of said first and second conduits, whereby said process stream is isolated from said housing as it flows between said first and second conduits.

2. A valve for controlling fluid in a process stream flowing from a first conduit to a second conduit comprising a valve housing having a pair of openings therethrough and a third opening forming a chamber in said housing, a removable core within said chamber and having a channel therethrough, said channel having an inlet and outlet respectively in communication with one of said pair of openings, a valve seat intermediate the length of said channel, a valve closure received in said third of said openings, means to bring said valve closure toward and away from said seat, conduit seat means removably secured to said housing within said pair of openings between said core and said conduits in sealing engagement with said core about said inlet and outlet and means including said core and conduit seat means for isolating said housing from said process stream between said first and second conduits.

3. A replaceable inner core for a valve housing for controlling fluid in a process stream flowing from a first conduit to a second conduit, which housing has a pair of opposed openings leading to the interior thereof, and a third opening intersecting said pair of openings, that improvement comprising a removable core within said housing having a channel therethrough, said channel having an inlet and outlet respectively in communication with said pair of openings, a valve seat intermediate the length of said channel, said core having a counter bore for receiving a valve operating member, two flat faces on said core respectively adjacent said inlet and outlet, a removable conduit seat in sealing engagement with each of said faces, said conduit seats respectively receiving in sealing engagement each of said first and second conduits and preventing removal of said core from said housing when said conduits are removed from engagement with said conduit seats and means, including said core and said seats, for isolating said housing from said process stream between said first and second conduits.

References Cited

UNITED STATES PATENTS

| 191,500 | 5/1877 | Wiegand | 251—225 |
| 447,275 | 2/1891 | Berrenberg | 137—375 |
| 529,051 | 11/1894 | Victor | 251—367 X |
| 1,210,891 | 1/1917 | Blanchard | 137—454.5 X |
| 1,743,338 | 1/1930 | Field | 251—367 X |
| 1,898,935 | 2/1933 | Brandriff | 137—454.2 X |
| 2,679,411 | 5/1954 | Moore | 285—219 X |
| 2,971,779 | 2/1961 | Woodling | 285—356 X |

FOREIGN PATENTS

| 883,048 | 1943 | France. |
| 1,018,685 | 1957 | Germany. |

WILLIAM F. O'DEA, Primary Examiner.

EMILE PAUL, Examiner.

R. GERARD, Assistant Examiner.